(12) United States Patent
Ono et al.

(10) Patent No.: US 10,753,249 B2
(45) Date of Patent: Aug. 25, 2020

(54) EXHAUST EMISSION CONTROL DEVICE FOR INTERNAL COMBUSTION ENGINE

(71) Applicant: TOYOTA JIDOSHA KABUSHIKI KAISHA, Toyota-shi (JP)

(72) Inventors: Ryohei Ono, Susono (JP); Masaaki Sato, Susono (JP); Katsuhiro Ito, Mishima (JP); Akira Mikami, Mishima (JP); Kazuhiro Umemoto, Ebina (JP); Daichi Imai, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 23 days.

(21) Appl. No.: 16/258,721

(22) Filed: Jan. 28, 2019

(65) Prior Publication Data

US 2019/0234269 A1    Aug. 1, 2019

(30) Foreign Application Priority Data

Jan. 30, 2018  (JP) ................................ 2018-013773

(51) Int. Cl.
*F01N 3/20*    (2006.01)
*F02M 26/00*   (2016.01)
*F01N 3/035*   (2006.01)
*F01N 13/00*   (2010.01)
*F01N 3/08*    (2006.01)

(52) U.S. Cl.
CPC ........... *F01N 3/2006* (2013.01); *F01N 3/035* (2013.01); *F01N 3/0814* (2013.01); *F01N 3/0842* (2013.01); *F01N 3/2013* (2013.01); *F01N 3/2066* (2013.01); *F01N 13/0093* (2014.06); *F01N 13/0097* (2014.06); *F02M 26/00* (2016.02); *F01N 2240/16* (2013.01); *F01N 2340/00* (2013.01)

(58) Field of Classification Search
CPC combination set(s) only.
See application file for complete search history.

(56) References Cited

U.S. PATENT DOCUMENTS

| 5,802,845 | A | * | 9/1998 | Abe | ................... | B01D 53/9481 |
| | | | | | | 60/274 |
| 6,151,890 | A | * | 11/2000 | Hoshi | ................... | F01N 3/0807 |
| | | | | | | 60/285 |
| 6,729,125 | B2 | * | 5/2004 | Suga | ................... | B01D 53/9454 |
| | | | | | | 60/285 |

(Continued)

FOREIGN PATENT DOCUMENTS

JP    2003-269149    9/2003

*Primary Examiner* — Binh Q Tran
(74) *Attorney, Agent, or Firm* — Oblon, McClelland, Maier & Neustadt, L.L.P.

(57) ABSTRACT

An exhaust emission control device for an internal combustion engine according to the present disclosure includes an exhaust emission control catalyst provided in an exhaust passage in an internal combustion engine and divided into a preceding catalyst and a succeeding catalyst, and a heating device provided in the exhaust passage between the preceding catalyst and the succeeding catalyst. The exhaust emission control catalyst is divided into the preceding catalyst and the succeeding catalyst so that a ratio of a capacity of the preceding catalyst to a total displacement of the internal combustion engine is from 0.3 to 1.5.

2 Claims, 5 Drawing Sheets

(56) References Cited

U.S. PATENT DOCUMENTS

| | | | |
|---|---|---|---|
| 6,742,330 B2* | 6/2004 | Genderen | B01D 53/90 60/286 |
| 10,280,822 B2* | 5/2019 | Ishikawa | F01N 3/2803 |
| 2005/0039446 A1* | 2/2005 | Majima | F01N 13/0097 60/289 |

* cited by examiner

EXHAUST EMISSION CONTROL DEVICE FOR INTERNAL COMBUSTION ENGINE

CROSS-REFERENCE TO RELATED APPLICATIONS

This application claims the benefit of Japanese Patent Application No. 2018-013773, filed on Jan. 30, 2018, which is hereby incorporated by reference herein in its entirety.

BACKGROUND

Technical Field

The present disclosure relates to an exhaust emission control device for an internal combustion engine, and more specifically to an exhaust emission control device which includes a heating device for heating an exhaust emission control catalyst.

Description of the Related Art

It has become common practice to provide an exhaust emission control catalyst in an exhaust passage in an internal combustion engine as a technique for controlling toxic gas components included in exhaust from the internal combustion engine. The exhaust emission control catalyst is able to control toxic gas components in the exhaust at an active temperature thereof or higher. Therefore, when the temperature of the exhaust emission control catalyst is less than the active temperature, such as when the internal combustion engine is started from cold, the temperature of the exhaust emission control catalyst must quickly be raised to the active temperature or higher. Meanwhile, in recent years, with the advanced techniques for improving fuel efficiencies of internal combustion engines, exhaust gas temperatures tend to decrease. Therefore, for example at the time of the cold starting of an internal combustion engine, it has become more difficult to quickly raise the temperature of an exhaust emission control catalyst to an active temperature thereof or higher only by the heat of the exhaust. To address this problem, there is a known method for raising the temperature of an exhaust emission control catalyst early, by providing an electric heater upstream of the exhaust emission control catalyst and heating exhaust coming into the exhaust emission control catalyst using the heater (see for example Japanese Patent Application Publication No. 2003-269149).

SUMMARY

When the exhaust emission control catalyst provided downstream of the heater has a relatively large capacity, time for heating the exhaust emission control catalyst by the heater may be prolonged in order to raise the temperature of the entire exhaust emission control catalyst to the active temperature or higher. In this case, the temperature of the upstream end of the exhaust emission control catalyst may be raised excessively before the temperature of the downstream end of the exhaust emission control catalyst is raised to the active temperature or higher, which may thermally degrade the upstream end of the exhaust emission control catalyst.

With the foregoing in view, it is an object of the present disclosure to provide a technique that allows an exhaust emission control catalyst to have its temperature quickly raised to an active temperature thereof or higher while the exhaust emission control catalyst is restrained from being thermally degraded.

In order to solve the above-described problem, according to the present disclosure, the exhaust emission control catalyst is divided into two, a preceding catalyst and a succeeding catalyst having equal thermal capacities per unit amount, and a heating device is provided between the preceding catalyst and the succeeding catalyst. The exhaust emission control catalyst is divided into the two catalysts so that the ratio of the capacity of the preceding catalyst to the total displacement of the internal combustion engine is from 0.3 to 1.5.

More specifically, the present disclosure concerns an exhaust emission control device for an internal combustion engine, the exhaust emission control device including: an exhaust emission control catalyst that is divided into a preceding catalyst and a succeeding catalyst having equal thermal capacities per unit amount, and that is provided in an exhaust passage in an internal combustion engine, the exhaust emission control catalyst being formed so that a ratio of a capacity of the exhaust emission control catalyst to a total displacement of the internal combustion engine is from 2.0 to 3.0; and a heating device provided in the exhaust passage between the preceding catalyst and the succeeding catalyst. The exhaust emission control catalyst is divided into the preceding catalyst and the succeeding catalyst so that a ratio of a capacity of the preceding catalyst to the total displacement of the internal combustion engine is from 0.3 to 1.5. Herein, the "total displacement of the internal combustion engine" refers to the product of the piston displacement per cylinder and the number of cylinders.

Using the exhaust emission control device for an internal combustion engine having the configuration, when the temperature of the exhaust emission control catalyst is lower than the active temperature, such as when the internal combustion engine is started from cold and the heating device is operated, the preceding catalyst receives the heat of the exhaust and has its temperature raised, and the succeeding catalyst receives heat from the heating device and has its temperature raised. Here, the amount of toxic gas components discharged from the internal combustion engine depends on the total displacement of the internal combustion engine. Therefore, the capacity of the exhaust emission control catalyst (the total capacity of the preceding catalyst and the succeeding catalyst) is generally determined so that the ratio of the capacity of the exhaust emission control catalyst to the total displacement of the internal combustion engine is from 2.0 to 3.0. As a result of intensive experiments and examinations on the exhaust emission control catalyst having the configuration, the inventors have found that when the exhaust emission control catalyst is divided into a preceding catalyst and a succeeding catalyst so that the ratio of the capacity of the preceding catalyst to the total displacement of the internal combustion engine is from 0.3 to 1.5, time required for raising the temperatures of these preceding and succeeding catalysts to an active temperature thereof or higher can be minimized. For example, when the total displacement of the internal combustion engine is 2.0 L (2000 cc), the capacity of the preceding catalyst is set in the range from 0.6 L (600 cc) to 3.0 L (3000 cc), so that time required for raising the temperatures of the preceding catalyst and the succeeding catalyst to the active temperature or higher may be minimized. In this way, time required for raising the temperature of the downstream end of the succeeding catalyst to the active temperature or higher can be reduced, so that time for heating the succeeding catalyst by the heater can be reduced. This makes it difficult for the upstream end of the succeeding catalyst to have its temperature raised excessively before the downstream end of the succeeding catalyst has its temperature raised to the active temperature or higher. Therefore, using the exhaust emission control device for an internal combustion engine according to the present disclosure, the temperature of the entire exhaust emission control catalyst can be raised to the active temperature or higher as quickly as possible while the temperature of the exhaust emission control catalyst is restrained from excessively increasing.

Here, the preceding catalyst and the succeeding catalyst according to the present disclosure do not have to be exactly the same catalyst, the preceding catalyst may be a $NO_x$ storage reduction (NSR) catalyst, and the succeeding catalyst may be a selective catalytic reduction (SCR) catalyst. In short, the preceding catalyst and the succeeding catalyst need only have equal thermal capacities per unit amount. Note that the state in which "the thermal capacities are equal per unit amount" herein is not limited to the case in which the thermal capacities per unit amount of the preceding catalyst and the succeeding catalyst are exactly the same, and there may be a little difference between the capacities (which may correspond to the difference between the thermal capacities per unit amount of an NSR catalyst and an SCR catalyst).

The succeeding catalyst may be configured to collect particulate matter (PM). More specifically, the succeeding catalyst may be carried by a particulate filter for collecting PM in exhaust. Here, the thermal capacity per unit amount of the succeeding catalyst having the PM collecting function is greater than the case without the function. Accordingly, the thermal capacity per unit amount of the succeeding catalyst having the PM collecting function is greater than that of the preceding catalyst without the PM collecting function. Therefore, in order to raise the temperature of the entire exhaust emission control catalyst to the active temperature or higher as quickly as possible while the temperature of the upstream end of the succeeding catalyst having the PM collecting function is restrained from excessively increasing, the capacity of the succeeding catalyst should be smaller and the capacity of the preceding catalyst should be greater than the case in which the succeeding catalyst does not have the PM collecting function. To this end, as a result of intensive experiments and examinations, the inventors have found that the entire exhaust emission control catalyst can have its temperature raised to an active temperature thereof or higher as quickly as possible while the temperature of the upstream end of the succeeding catalyst is restrained from excessively increasing when the exhaust emission control catalyst is divided into the preceding catalyst and the succeeding catalyst so that the ratio of the capacity of the preceding catalyst to the total displacement of the internal combustion engine is from 0.5 to 1.7. Therefore, when the succeeding catalyst has the PM collecting function (when the thermal capacity per unit amount of the succeeding catalyst is greater than the thermal capacity per unit amount of the preceding catalyst), the exhaust emission control catalyst may be divided into the preceding catalyst and the succeeding catalyst so that the ratio of the capacity of the preceding catalyst to the total displacement of the internal combustion engine is from 0.5 to 1.7.

Here, the heating device according to the present disclosure may be a heating device which heats exhaust coming into the succeeding catalyst using energy other than the thermal energy of the exhaust and may be an electric heating type heater which heats the exhaust using electric energy or a combustion type heater which heats the exhaust using thermal energy generated by combusting fuel.

According to the present disclosure, the temperature of the exhaust emission control catalyst can be raised quickly to an active temperature thereof or higher while the exhaust emission control catalyst is restrained from being thermally degraded.

DESCRIPTION OF EMBODIMENTS

Now, specific embodiments of the present disclosure will be described in conjunction with the accompanying drawing. The sizes, materials, and shapes of the components, their relative positional arrangements, etc. in the following description of the embodiments are not intended to limit the scope of the present disclosure unless otherwise specified.

First Embodiment

Figure 1:
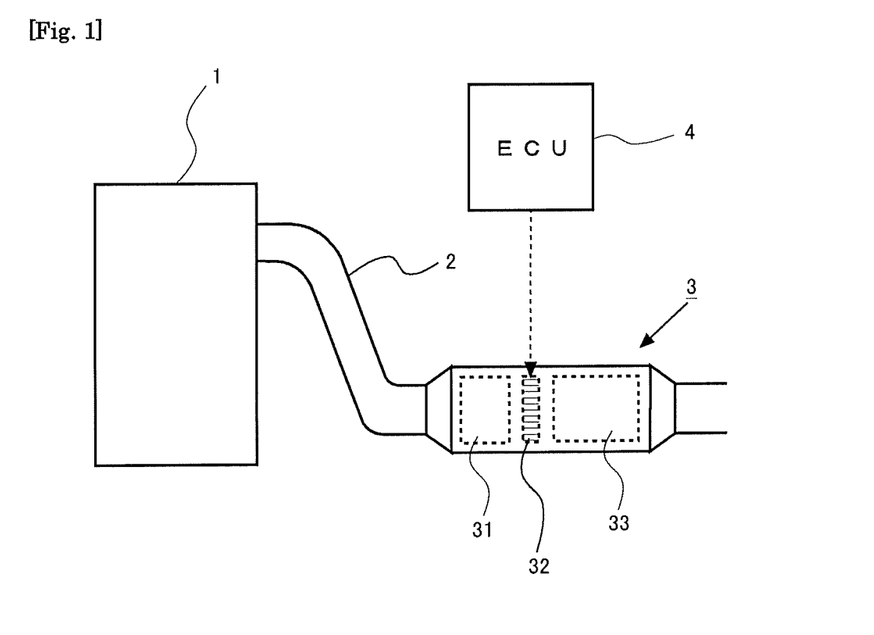
FIG. 1 is a schematic view of an exhaust system in an internal combustion engine according to a first embodiment of the present disclosure.
Figure 2:
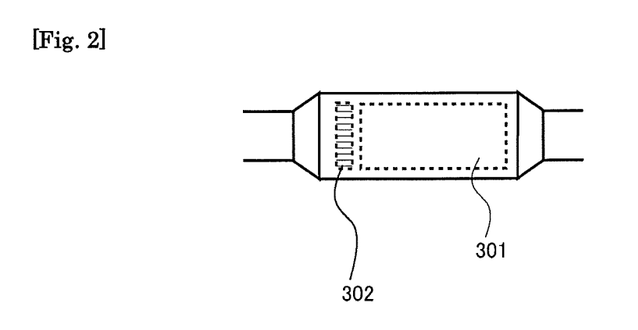
FIG. 2 is a view illustrating an exhaust emission control catalyst according to a comparative example.

First, a first embodiment of the present disclosure will be described with reference to FIGS. 1 to 3. FIG. 1 is a schematic view of an exhaust system in an internal combustion engine according to the present disclosure.

The internal combustion engine 1 illustrated in FIG. 1 is a compression ignition type internal combustion engine (diesel engine) using light oil as a fuel. The internal combustion engine 1 is connected with an exhaust passage 2 for distributing gas combusted within a cylinder of the internal combustion engine 1. An exhaust emission control catalyst 3 is provided in the exhaust passage 2. The exhaust emission control catalyst 3 is divided into a preceding catalyst 31 and a succeeding catalyst 33 and stored in a substantially tubular casing. The preceding catalyst 31 and the succeeding catalyst 33 are each a catalyst having the function of reducing $NO_x$ included in exhaust and may be an NSR catalyst or an SCR catalyst. Note that the preceding catalyst 31 and the succeeding catalyst 33 do not have to be exactly the same catalyst and may be different catalysts if the catalysts have substantially equal thermal capacities per unit amount. For example, the preceding catalyst 31 may be an NSR catalyst, and the succeeding catalyst 33 may be an SCR catalyst. In this case, an addition valve for supplying ammonia ($NH_3$) or a precursor to $NH_3$ as an additive to the succeeding catalyst 33 may be provided between the preceding catalyst 31 and the succeeding catalyst 33.

The exhaust emission control catalyst 3 includes a heating device 32 provided between the preceding catalyst 31 and the succeeding catalyst 33. The heating device 32 is an electric heating type heater configured to heat exhaust coming in the succeeding catalyst 33 by converting electric energy supplied from a battery (not illustrated) into thermal energy and controlled by an electronic control unit (ECU) 4. Note that the heating device 32 may be a combustion type heater which generates thermal energy by combusting fuel.

The ECU 4 operates to activate the exhaust emission control catalyst 3 early by supplying electric energy from the battery to the heating device 32 when the temperature of the exhaust emission control catalyst 3 is lower than the active temperature such as immediately after the cold starting of the internal combustion engine 1. Here, a comparative example with respect to the embodiment is illustrated in FIG. 2. In the comparative example illustrated in FIG. 2, an exhaust emission control catalyst 301 is not divided into two, and a heating device 302 is provided upstream of the exhaust emission control catalyst 301. The capacity of the exhaust emission control catalyst 301 illustrated in FIG. 2 is equal to the total capacity of the preceding catalyst 31 and the succeeding catalyst 33 illustrated in FIG. 1 and determined depending on the amount of $NO_x$ discharged from the internal combustion engine 1. Note that the amount of $NO_x$ discharged from the internal combustion engine 1 depends on the total displacement of the internal combustion engine 1 (which is the product of the piston displacement per cylinder and the number of cylinders), and therefore the capacity of the exhaust emission control catalyst 301 is for example determined so that the ratio of the capacity of the exhaust emission control catalyst 301 to the total displacement of the internal combustion engine 1 is about from 2.0 to 3.0. More specifically, when the total displacement of the internal combustion engine 1 is 2.0 L (2000 cc), the capacity of the exhaust emission control catalyst 301 is determined about in the range from 4.0 L (4000 cc) to 6.0 L (6000 cc). In the configuration as illustrated in FIG. 2, the capacity of the exhaust emission control catalyst 301 provided downstream of the heating device 302 is greater than the capacity of the succeeding catalyst 33 according to the embodiment, and therefore time required for raising the temperature of the downstream end of the exhaust emission control catalyst 301 to an active temperature thereof or higher (or time for heating the exhaust emission control catalyst 301 by the heating device 302) is more likely to be prolonged. In this way, the temperature of the upstream end of the exhaust emission control catalyst 301 is more easily raised before the temperature of the downstream end of the exhaust emission control catalyst 301 is raised to the active temperature or higher, so that the upstream end may be thermally degraded. In contrast, as illustrated in FIG. 1, the exhaust emission control catalyst 3 according to the embodiment is divided into the preceding catalyst 31 and the succeeding catalyst 33, and the heating device 32 is provided between the preceding catalyst 31 and the succeeding catalyst 33, so that the capacity of the succeeding catalyst 33 provided downstream of the heating device 32 is smaller than that in the comparative example. As a result, the time required for raising the temperature of the downstream end of the succeeding catalyst 33 to the active temperature or higher after the start of the operation of the heating device 32 may be reduced. In this way, the entire succeeding catalyst 33 can have its temperature raised to the active temperature or higher while the temperature of the upstream end of the succeeding catalyst 33 is restrained from excessively increasing.

Meanwhile, as illustrated in FIG. 1, when the exhaust emission control catalyst 3 is divided into the preceding catalyst 31 and the succeeding catalyst 33, and the heating device 32 is provided between the preceding catalyst 31 and the succeeding catalyst 33, the temperature of the preceding catalyst 31 is raised only by the thermal energy of the exhaust. Here, the total capacity of the preceding catalyst 31 and the succeeding catalyst 33 is determined depending on the total displacement of the internal combustion engine 1 as described above, and therefore if the capacity of the succeeding catalyst 33 is reduced, the capacity of the preceding catalyst 31 must be increased accordingly. In this way, if the capacity of the preceding catalyst 31 is excessively large, it may take prolonged time until the entire preceding catalyst 31 is activated, so that time required for raising the temperature of the entire exhaust emission control catalyst 3 to the active temperature or higher may be increased. To this end, as a result of intensive experiments and examinations, the inventors have found that the entire exhaust emission control catalyst 3 can have its temperature raised to an active temperature thereof or higher as quickly as possible when the exhaust emission control catalyst 3 is divided into the preceding catalyst 31 and the succeeding catalyst 33 so that the ratio of the capacity of the preceding catalyst 31 to the total displacement of the internal combustion engine 1 is from 0.3 to 1.5.

Figure 3:
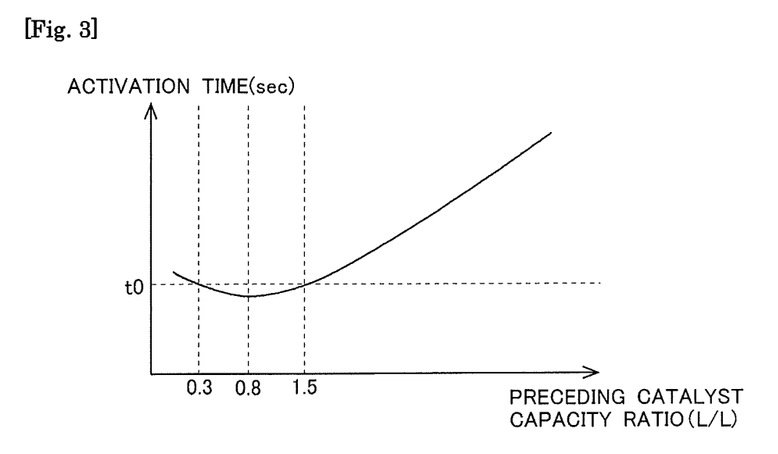
FIG. 3 is a graph illustrating a correlation between a preceding catalyst capacity ratio and activation time according to the first embodiment.

FIG. 3 is a graph illustrating a correlation between the ratio of the capacity of the preceding catalyst 31 to the total displacement of the internal combustion engine 1 (a preceding catalyst capacity ratio) and time required for raising the temperature of the entire exhaust emission control catalyst 3 to an active temperature thereof (activation time) when the exhaust emission control catalyst 3 is formed so that the ratio of the capacity of the exhaust emission control catalyst 3 (the total capacity of the preceding catalyst 31 and the succeeding catalyst 33) to the total displacement of the internal combustion engine 1 is from 2.0 to 3.0. In FIG. 3, t0 designates time obtained by subtracting a margin from the maximum heating time that allows the temperature of the upstream end of the succeeding catalyst 33 to be within an appropriate temperature range when the succeeding catalyst 33 is heated by the heating device 32, and the time is determined by adaptation operation based on results of experiments and simulations.

As illustrated in FIG. 3, when the exhaust emission control catalyst 3 is divided into the preceding catalyst 31 and the succeeding catalyst 33 so that the preceding catalyst capacity ratio is from 0.3 to 1.5, the time required for raising the temperature of the entire exhaust emission control catalyst 3 to the active temperature can be kept equal to or less than the maximum heating time t0. For example, when the total displacement of the internal combustion engine 1 is 2.0 L (2000 cc), the exhaust emission control catalyst 3 may be divided into the preceding catalyst 31 and the succeeding catalyst 33 so that the capacity of the preceding catalyst 31 is from 0.6 L (600 cc) to 3.0 L (3000 cc). In this case, if the exhaust emission control catalyst 3 is divided in the preceding catalyst 31 and the succeeding catalyst 33 so that the preceding catalyst capacity ratio is in the vicinity of 0.8, the time required for raising the temperature of the entire exhaust emission control catalyst 3 to the active temperature may be as short as possible. As a result, the temperature of the entire exhaust emission control catalyst 3 can be raised to the active temperature as quickly as possible while the temperature of the upstream end of the succeeding catalyst 33 is restrained from being excessively raised by heating using the heating device 32.

Second Embodiment

Now, a second embodiment of the present disclosure will be described with reference to FIGS. 4 and 5. Here, features different from the first embodiment will be described, and the same features as those of the previous embodiment will not be described.

According to the description of the first embodiment, the preceding catalyst and the succeeding catalyst each have only a catalytic function (in other words, the preceding catalyst and the succeeding catalyst have substantially equal thermal capacities per unit amount), and in the following description of this embodiment, while the preceding catalyst has only a catalytic function, the preceding catalyst has a catalytic function and a PM collecting function (filtering function).

Figure 4:
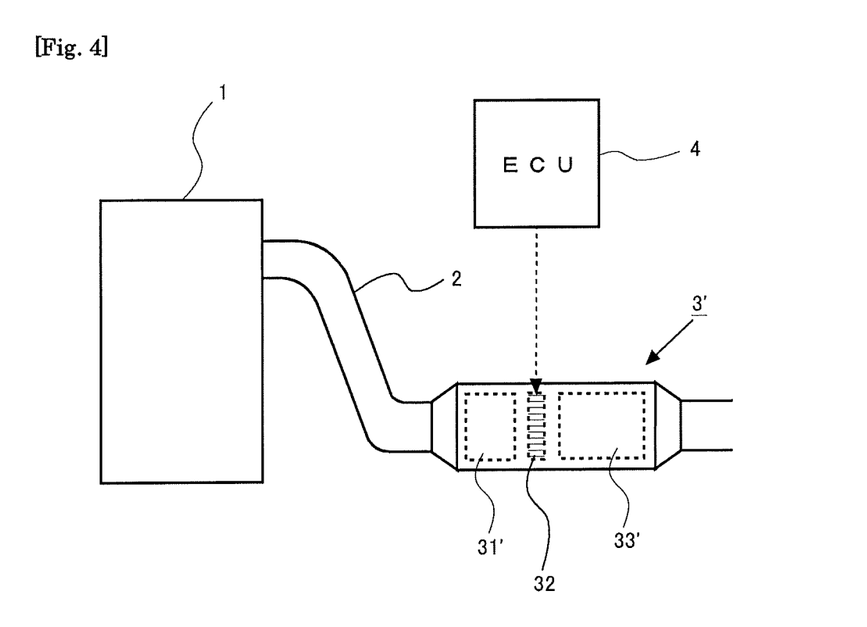
FIG. 4 is a schematic view of an exhaust system in an internal combustion engine according to a second embodiment of the present disclosure.

FIG. 4 is a schematic view of an exhaust system in an internal combustion engine 1 according to the embodiment. In FIG. 4, a preceding catalyst 31' is made of an NSR catalyst. Meanwhile, the succeeding catalyst 33' is an SCR catalyst carried by a particulate filter. In this case, the capacity of the succeeding catalyst 33' should be set to a capacity which allows PM discharged from the internal combustion engine 1 to be collected by the particulate filter of the succeeding catalyst 33' (such as a capacity which allows the ratio of the capacity of the succeeding catalyst 33' to the total displacement of the internal combustion engine 1 to be at least 1.0). The thermal capacity per unit amount of the succeeding catalyst 33' having the above described configuration is greater than that of the succeeding catalyst 33 without the PM collecting function. Accordingly, the thermal capacity per unit of the succeeding catalyst 33' having the PM collecting function is greater than the thermal capacity per unit amount of the preceding catalyst 31' without the PM collecting function. Therefore, in order to raise the temperature of the entire exhaust emission control catalyst 3 to the active temperature as quickly as possible while the temperature of the upstream end of the succeeding catalyst 33' is restrained from increasing, the capacity of the succeeding catalyst 33' should be smaller and the capacity of the preceding catalyst 31' should be greater than those of the first embodiment. Therefore, according to the embodiment, as illustrated in FIG. 5, the capacities of the preceding catalyst 31' and the succeeding catalyst 33' can be determined so that the preceding catalyst capacity ratio of the preceding catalyst 31' is within the range from 0.5 to 1.7. For example, when the total displacement of the internal combustion engine 1 is 2.0 L (2000 cc), the capacities of the preceding catalyst 31' and the succeeding catalyst 33' may be determined so that the capacity of the preceding catalyst 31' is from 1.0 L (1000 cc) to 3.4 L (3400 cc). At the time, if the capacities of the preceding catalyst 31' and the succeeding catalyst 33' are determined so that the preceding catalyst capacity ratio of the preceding catalyst 31' is in the vicinity of 1.0, the time required for raising the temperature of the entire exhaust emission control catalyst 3' to the active temperature can be as short as possible. Note that t0' in FIG. 5 designates time obtained by subtracting a margin from the maximum heating time that allows the temperature of the upstream end of the succeeding catalyst 33' to be within an appropriate temperature range when the succeeding catalyst 33' is heated by the heating device 32.

Figure 5:
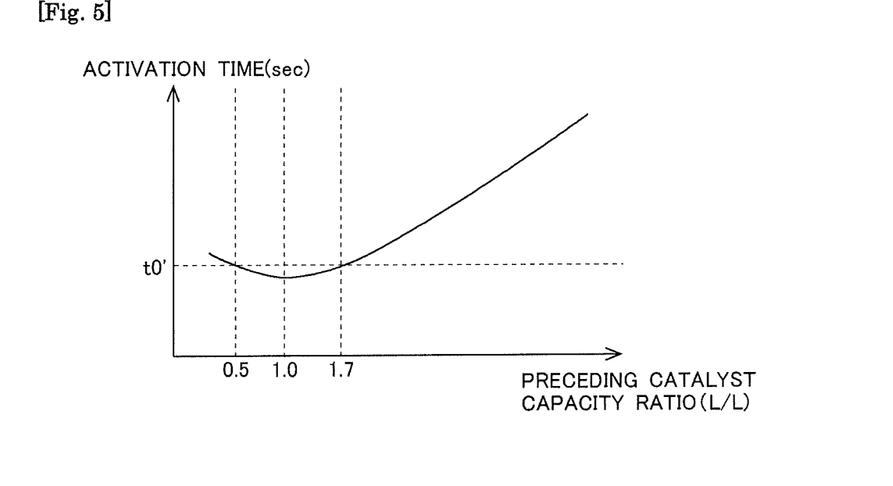
FIG. 5 is a graph illustrating a correlation between a preceding catalyst capacity ratio and activation time according to the second embodiment.

Therefore, when the succeeding catalyst 33' has both the catalytic function and the PM collecting function (when the thermal capacity per unit amount of the succeeding catalyst 33' is greater than the thermal capacity per unit amount of the preceding catalyst 31'), and the capacities of the preceding catalyst 31' and the succeeding catalyst 33' are determined so that the preceding catalyst capacity ratio is from 0.5 to 1.7 as illustrated in FIG. 5, the temperature of the entire exhaust emission control catalyst 3 can be raised to the active temperature as quickly as possible while the temperature of the upstream end of the succeeding catalyst 33' is restrained from being excessively raised by heating using the heating device 32.

<Other Features>

Note that considering the correlations illustrated in FIGS. 3 and 5, regardless of whether the succeeding catalyst has the PM collecting function, when the capacities of the preceding catalyst and the succeeding catalyst are determined so that the preceding catalyst capacity ratio of the preceding catalyst is from 0.5 to 1.5, the temperature of the entire exhaust emission control catalyst can be raised to the active temperature as quickly as possible while the temperature of the upstream end of the succeeding catalyst is prevented from being excessively raised.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An exhaust emission control device for an internal combustion engine, the exhaust emission control device comprising:
   an exhaust emission control catalyst that is divided into a preceding catalyst and a succeeding catalyst having equal thermal capacities per unit amount, and that is provided in an exhaust passage in an internal combustion engine, the exhaust emission control catalyst being formed so that a ratio of a capacity of the exhaust emission control catalyst to a total displacement of the internal combustion engine is from 2.0 to 3.0; and
   a heating device provided in the exhaust passage between the preceding catalyst and the succeeding catalyst, wherein
   the exhaust emission control catalyst is divided into the preceding catalyst and the succeeding catalyst so that a ratio of a capacity of the preceding catalyst to the total displacement of the internal combustion engine is from 0.3 to 1.5.

2. An exhaust emission control device for an internal combustion engine, the exhaust emission control device comprising:
   an exhaust emission control catalyst that is divided into a preceding catalyst and a succeeding catalyst which has a PM collecting function, and that is provided in an exhaust passage in an internal combustion engine, the exhaust emission control catalyst being formed so that a ratio of a capacity of the exhaust emission control catalyst to a total displacement of the internal combustion engine is from 2.0 to 3.0; and
   a heating device provided in the exhaust passage between the preceding catalyst and the succeeding catalyst, wherein
   the exhaust emission control catalyst is divided into the preceding catalyst and the succeeding catalyst so that a ratio of a capacity of the preceding catalyst to the total displacement of the internal combustion engine is from 0.5 to 1.7.

* * * * *